March 12, 1940.  W. A. HARDWICK  2,193,366
MILK BOTTLE ATTACHMENT
Original Filed Feb. 16, 1934  2 Sheets-Sheet 1
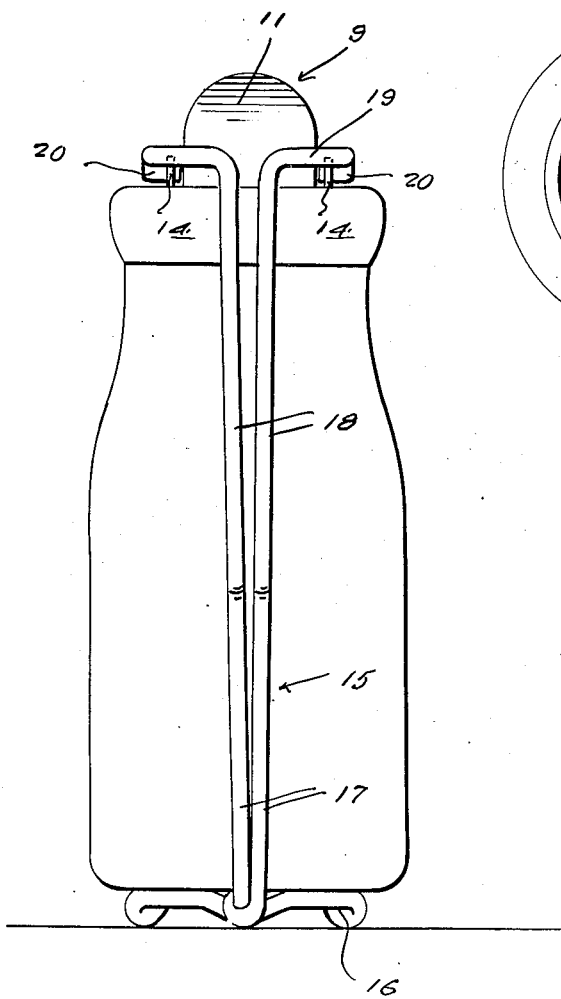
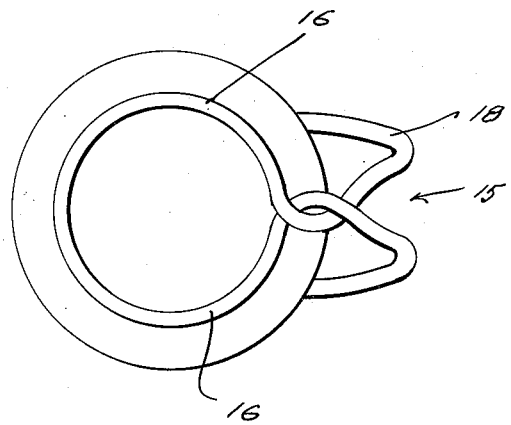
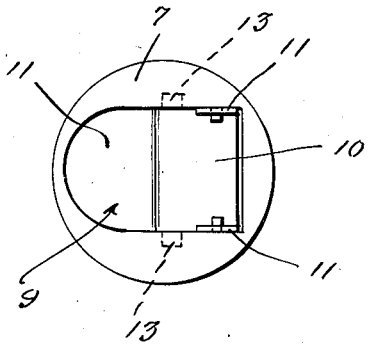
Inventors
W. A. Hardwick
By Clarence A. O'Brien
Attorney March 12, 1940. W. A. HARDWICK 2,193,366
MILK BOTTLE ATTACHMENT
Original Filed Feb. 16, 1934 2 Sheets-Sheet 2
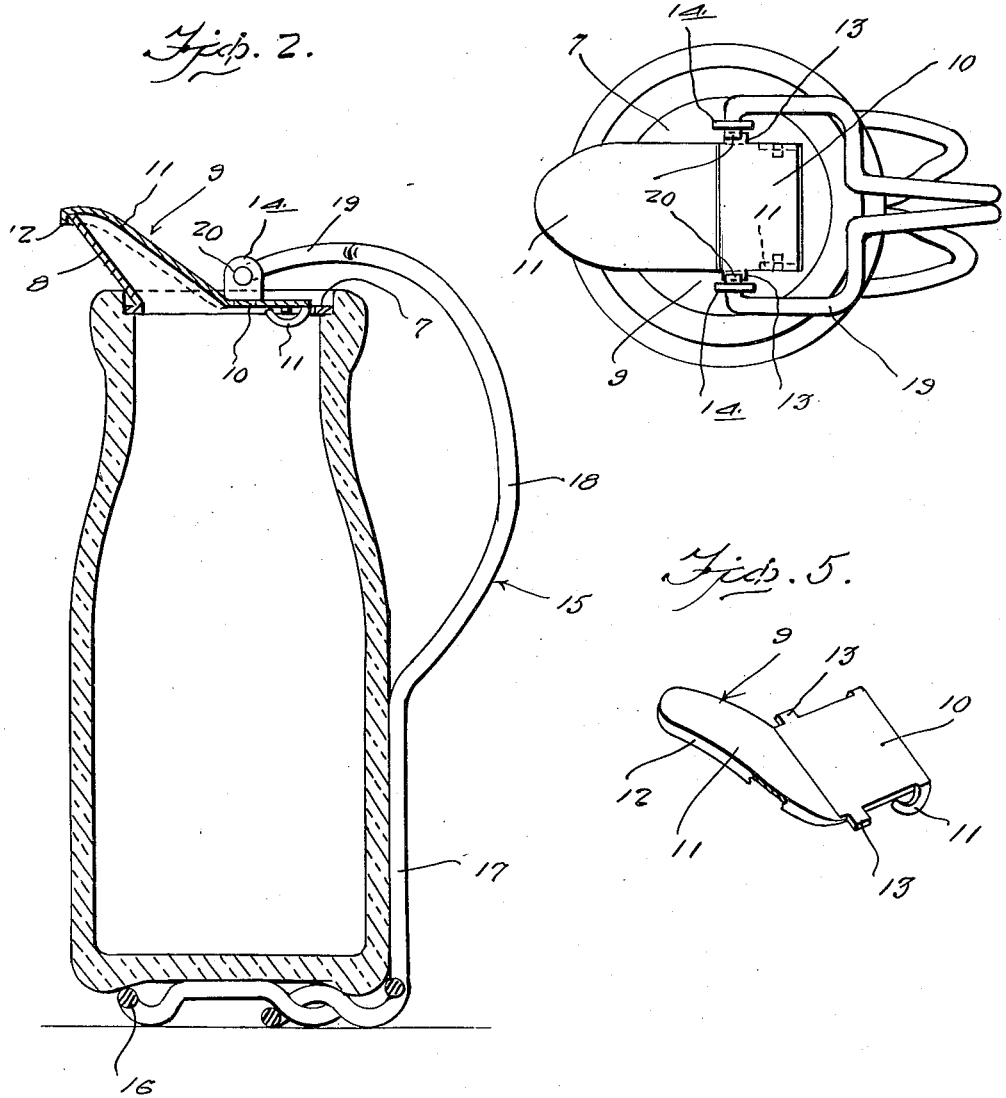
Inventor
W. A. Hardwick
By Clarence A. O'Brien
Attorney Patented Mar. 12, 1940

2,193,366

UNITED STATES PATENT OFFICE 2,193,366

MILK BOTTLE ATTACHMENT

William Allyn Hardwick, Winona, Minn.

Substitute for abandoned application Serial No. 711,597, February 16, 1934. This application May 5, 1939, Serial No. 272,024

2 Claims. (Cl. 215—100)

This invention relates to a household accessory or appliance in the nature of an attachment for milk bottles, the same serving in one instance as a holder for the bottle and secondly, to facilitate pouring the contents from the bottle in an expeditious and dependable manner.

This matter is predicated on formally allowed but now abandoned application Serial No. 711,597, filed Feb. 16, 1934.

Broadly stated, the invention depends for novelty upon the adaption and use of a metal cap to replace the usual cardboard cap, said metal cap being fashioned to embody a pouring spout and provided with a closing lid for said spout which does not interfere with the discharge of the contents of the bottle, and to thereafter promote sanitation and cleanliness by excluding dust and dirt.

Another feature of the invention is predicated upon the co-ordination with said special cap of unique and dependable means for holding the cap removably in place, wherein said means serves within itself as a holder for the bottle in that it embodies a convenient handle.

The preferred embodiment of the invention and the chosen details which exemplify it as an improvement in the trade and a contribution to the art will become more readily apparent from the following description and drawings.

In the accompanying drawings wherein like numerals are employed to designate like parts throughout the views:—

Figure 1 is an elevational view showing the attachment and the manner in which it is associated with a conventional milk or cream bottle.

Figure 2 is a vertical sectional view, with parts in elevation, taken at approximate right angles to Figure 1.

Figure 3 is a bottom plan view showing the adapter or clamping ring co-operable with the bottom of the bottle.

Figure 4 is a top plan view of Figure 1.

Figure 5 is a detailed perspective view of the especially designed closing lid.

Figure 6 is a bottom plan view of the substitute metal bottle cap for temporary use.

Referring first to Figure 1, it will be observed that the disk-like metal cap is denoted by the numeral 7 and this is shaped and proportioned to function as a substitute for the usual cardboard cap provided by the dairy. This has its central portion cut-out to provide an opening through which the contents of the bottle may be conveniently discharged. Surrounding this opening is an upstanding integral part which, as shown in Figure 2, is fashioned to provide a pouring spout 8. The closing unit or lid is differentiated by the numeral 9 and this is formed separately from the cap proper. As shown in Figure 5, it comprises a metal stamping embodying a substantially rectangular part 10 having hook-shaped elements 11 on opposite sides which serve as hinges. These are passed through apertures formed in the cap, as shown in Figure 2, to provide the requisite hinged connection between the lid and cap. The lid also embodies a tongue which is shaped to cooperate with the spout and which is provided with a marginal flange or rim 12 providing the desired co-acting joint between the lid and spout. This is a gravity or self-closing lid. When the bottle is tilted, the pressure of the contents of the bottle against the lid serves to open it and to facilitate pouring. When the bottle is again righted, the lid flaps down to closing position. As a stabilizing feature, it will be observed that the rectangular portion 10 of the lid is provided with stop lugs 13. Adjacent to the lugs, but formed on the lid proper, are upstanding apertured ears 14. This entire cap, as a unit, is removable for cleaning purposes and preferably connected with the attaching frame or holder 15.

Although the holding frame may be constructed otherwise, it has been found satisfactory and expeditious to form it from a single length of wire which is bent and fashioned in the manner shown in the drawings. To begin with, it may be said that the wire is bent at a point between its ends to form an adapter ring 16 of appropriate shape and proportions. This is adapted to be nested into the depression in the bottom of the bottle to serve as a clamp. The upstanding portions of the wire, bent at right angles to the ring, as indicated at 17, extend up along the bottle and in contact therewith to a predetermined point where they are separated and bent out into arcuate or longitudinally bowed form, as indicated at 18, and these features form a suitable handle or hand grip. The extreme upper ends of the wire are bent to form what may be differentiated as a yoke 19 and the ends of the yoke 20 are detachably connected with the ears 14 whereby to connect the cap with the frame and to assemble all of the parts for such convenient application and removal. As before stated, the cap can be detached from the frame so that the cap and its feaures can be easily washed and cleaned.

It is to be pointed out that the frame is of spring metal and is so proportioned with respect to the bottle that it fits snugly on the bottle. Its inherent features of resiliency serve to attach the holder to the bottle and to securely keep the cap in place. Thus, in a sense, I have an adapter ring or clamp at one end of the device yieldably engaging the bottom of the bottle and a cap at the opposite end of the device detachably connectible with the neck of the bottle, with the intervening or intermediate portion of the holder fashioned to provide a convenient handle to expedite handling the bottle while pouring the contents.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

I claim:

1. A bottle closure and pouring device of the class described comprising a disk-like cap adapted to be seated removably on the ledge of the bead of the bottle, said cap being apertured and formed with an extension shaped to perform as a pouring spout, a pressure opened gravity closed lid for said spout, said lid embodying a substantially horizontal rectangular portion having hooked hinge elements hingedly connected with the cap, further provided with outstanding stop lugs engageable with the top of the cap, and an oblique tongue serving as a cover for the spout, and formed with a surrounding rim flange.

2. A bottle closure and pouring device of the class described comprising a disk-like cap adapted to be seated removably on the ledge of the bead of the bottle, said cap being apertured and formed with an extension shaped to perform as a pouring spout, a pressure opened gravity closed lid fashioned to cooperate with said spout, said lid being hingedly connected with said cap and provided with a pair of outstanding stop lugs on its longitudinal edges, said lugs being disposed opposite each other, said cap being provided with a pair of upstanding apertured attaching ears located opposite each other and opposite said lugs, and a bottle holding frame formed from wire and bent at its lower end to engage the bottom of the bottle bent adjacent its upper end to provide hand grips, the upper free end portion of said holder being bent to provide a yoke, overlying said cap, the extremities of said yoke being inturned laterally toward each other and hingedly connected to said ears, the inturned ends overlying said lugs to limit the outward or upward swinging movement of said lid.

WILLIAM A. HARDWICK.